(12) United States Patent
Cheng et al.

(10) Patent No.: US 8,294,763 B2
(45) Date of Patent: Oct. 23, 2012

(54) METHOD FOR BUILDING AND EXTRACTING ENTITY NETWORKS FROM VIDEO

(75) Inventors: Hui Cheng, Bridgewater, NJ (US);
Jiangjian Xiao, Plainsboro, NJ (US);
Harpreet Sawhney, West Windsor, NJ (US)

(73) Assignee: SRI International, Menlo Park, CA (US)

( * ) Notice: Subject to any disclaimer, the term of this patent is extended or adjusted under 35 U.S.C. 154(b) by 978 days.

(21) Appl. No.: 12/271,173

(22) Filed: Nov. 14, 2008

(65) Prior Publication Data
US 2009/0153661 A1    Jun. 18, 2009

Related U.S. Application Data

(60) Provisional application No. 61/013,888, filed on Dec. 14, 2007.

(51) Int. Cl.
*H04N 7/18* (2006.01)

(52) U.S. Cl. ........................................ 348/143

(58) Field of Classification Search .................. 348/143
See application file for complete search history.

(56) References Cited

U.S. PATENT DOCUMENTS

| 7,046,169 | B2 * | 5/2006  | Bucholz et al. | 340/937 |
| 7,363,548 | B2 * | 4/2008  | Ramsden et al. | 714/48  |
| 7,599,544 | B2 * | 10/2009 | Moshe          | 382/141 |
| 7,787,656 | B2 * | 8/2010  | Chen           | 382/103 |
| 7,999,857 | B2 * | 8/2011  | Bunn et al.    | 348/211.1 |

* cited by examiner

*Primary Examiner* — David Eng
(74) *Attorney, Agent, or Firm* — Moser Taboada

(57) ABSTRACT

A computer implemented method for deriving an attribute entity network (AEN) from video data is disclosed, comprising the steps of extracting at least two entities from the video data, tracking the trajectories of the at least two entities to form at least two tracks, deriving at least one association between at least two entities by detecting at least one event involving the at least two entities, where the detecting of at least one event is based on detecting at least one spatiotemporal motion correlation between the at least two entities, and constructing the AEN by creating a graph wherein the at least two objects form at least two nodes and the at least one association forms a link between the at least two nodes.

22 Claims, 9 Drawing Sheets

METHOD FOR BUILDING AND EXTRACTING ENTITY NETWORKS FROM VIDEO

CROSS-REFERENCE TO RELATED APPLICATIONS

This application claims the benefit of U.S. provisional patent application No. 61/013,888 filed Dec. 14, 2007, the disclosure of which is incorporated herein by reference in its entirety.

GOVERNMENT RIGHTS IN THIS INVENTION

This invention was made with U.S. government support under contract number H94003-04-120006-0011. The U.S. government has certain rights in this invention.

FIELD OF THE INVENTION

The present invention relates generally to vision systems, and more particularly to a method and system that automatically detects and relates entities found in video and builds entity networks that can be stored in a database for later recall.

BACKGROUND OF THE INVENTION

Entities can include people, vehicles, houses, etc. Entity association in the context of gathering and relating entity data for defense, surveillance systems, sports and entertainment archiving systems is traditionally accomplished using text or structured data, such as known affiliations. In such contexts, it would be desirable to associate structured text data with images and/or video taken of a scene to enhance the meaning of the structured text data and allow for the extraction of meaningful inferences about the data with a high degree of certainty. For example, if a plurality of trucks is traveling together on a highway for an extended period of time, it can be inferred that the collection of trucks are traveling in a convoy. Thus, the video would be tagged with the label "convoy." In another example, a person is seen entering a car driven by another person. Then, the two persons are likely to know each other.

It would be desirable to associate visual attributes to entities and with video imagery. Persistent and wide-area coverage of video imagery provides an opportunity to monitor the behavior of entities, Such as vehicles, people and sites, over long periods of time and large geo-spatial extents. It would also be desirable to deduce the relationship of entities under different contexts and in the presence of clutter and under uncertainties inherent in detecting, classifying and tracking entities from video data. Any entity information derived from videos has an associated probability or belief computed from the data. Inferences of associations use propagation of uncertainties within a network representation built from the data. Therefore, linkages can be established and hidden relationships can be discovered among entities automatically.

Accordingly, what would be desirable, but has not yet been provided, is a system and method for effectively and automatically detecting and relating entities from video data, deducing inferences from the data and their relationships, automatically constructing entity networks, and storing and later retrieving the entity networks for later analysis.

SUMMARY OF THE INVENTION

The above-described problems are addressed and a technical solution is achieved in the art by providing a computer implemented method for deriving an attribute entity network (AEN) from video data, comprising the steps of extracting at least two entities from the video data; tracking the trajectories of the at least two entities to form at least two tracks; deriving at least one association between at least two entities by detecting at least one event involving the at least two entities, said detecting of at least one event being based on detecting at least one spatio-temporal motion correlation between the at least two entities; and constructing the AEN by creating a graph wherein the at least two objects form at least two nodes and the at least one association forms a link between the at least two nodes. The entity extraction step further comprises the steps of detecting moving objects and classifying them into vehicle and people; and determining which structures in the video data are at least one of roads, parking lots, buildings and building descriptions of sites. The deriving step further comprises the steps of calculating a similarity measure of the closeness of two tracklets; identifying entity behaviors (spatial actions and behavioral action); and performing pattern analysis to group tracklets and sites.

The at least one event is classified as one of a spatial action and a behavioral action. A behavioral action is detected using Spatial-Temporal Object (STO) Analysis. STO Analysis comprises the steps of: obtaining a focus-of-attention of moving objects in the video data using Spatio-Temporal Cues; obtaining spatio-temporal fragments extracted from the moving objects within the focus-of-attention, the moving objects including at least one person; combining the obtaining spatio-temporal fragments to compute at least one pose of the at least one person; extracting and classifying at least one object associated the at least one person; extracting feature words are extracted from the at least one objects and at least one person to create spatio-temporal object words; encoding the spatio-temporal object words as feature vectors; and classifying the feature vectors using a Supporting Vector Machine (SVM).

The method can further comprise the steps of merging an event ontology with hierarchical weighted graph matching to reduce the candidate space, which in turn comprises the steps of constructing an event graph wherein a node represents a sub-event and a link represents the type of temporal transition between two nodes, the link being assigned a weight that is proportional to the importance of the temporal transition to the overall event; forming a hierarchical event description by removing nodes with small weights and combining the links between nodes with large weights; matching observations using the hierarchical event graph at its highest level, wherein observations receiving a predetermined minimum matching score being passed to a next level for verification; and repeating the step of matching with other observations until a predetermined confidence level is achieved for accepting or rejecting an event. The step of matching further comprising the step of computing the similarity between two events using a shortest path length measure between two objects/actions in an object/action taxonomy.

The method can further comprise the step of employing a Markov Logic Network for reasoning and inferencing in visual and geo-spatial domains.

BRIEF DESCRIPTION OF THE DRAWINGS

The present invention will be more readily understood from the detailed description of exemplary embodiments pre sented below considered in conjunction with the attached drawings, of which.

It is to be understood that the attached drawings are for purposes of illustrating the concepts of the invention and may not be to scale.

DETAILED DESCRIPTION OF THE INVENTION

Figure 1:
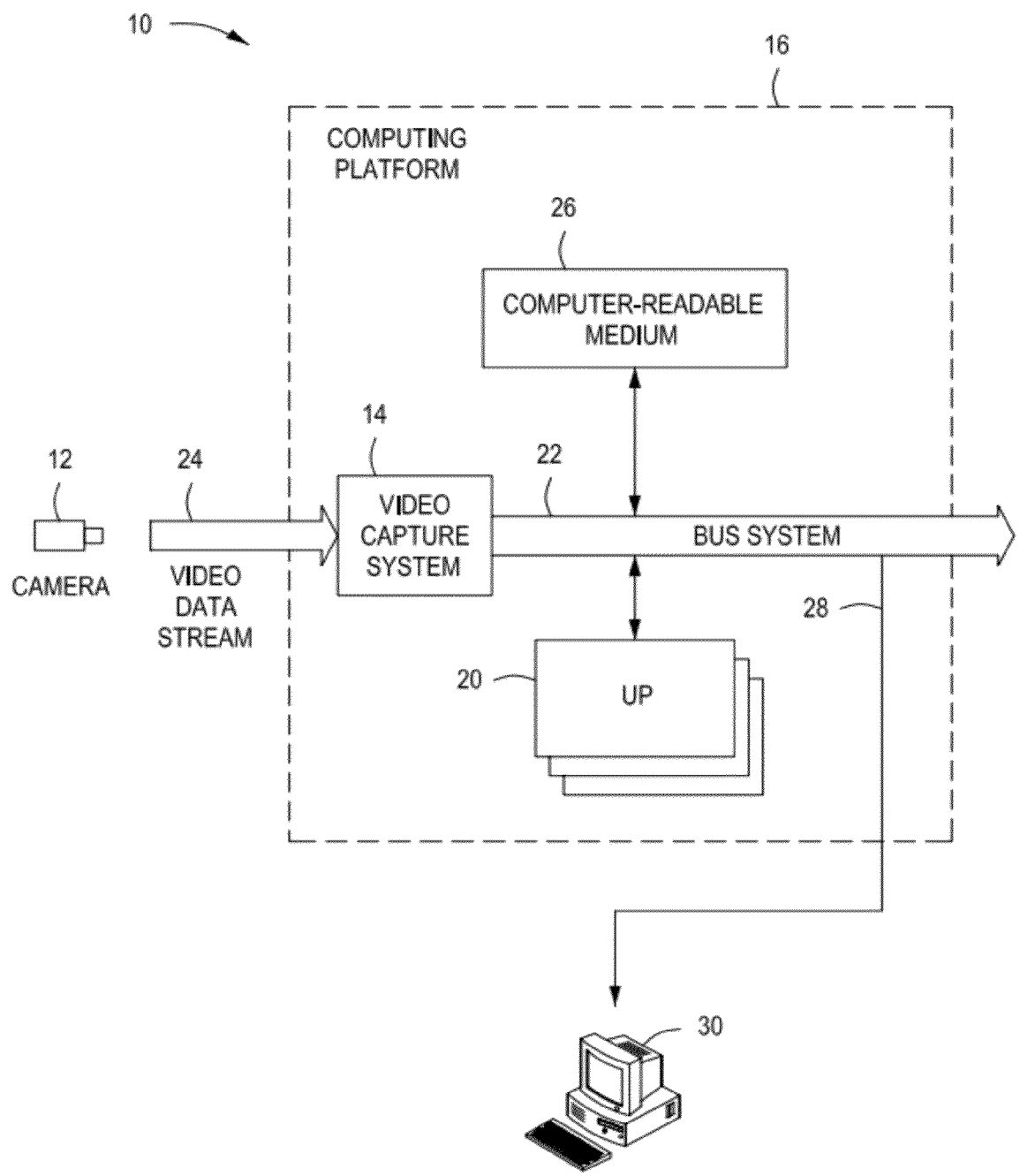
FIG. 1 is a block diagram of a hardware architecture for a system for deriving an attribute entity network (AEN) from video, constructed in accordance with an embodiment of the present invention.

Referring now to FIG. 1, a system for deriving entity networks from video is depicted, generally indicated at 10. By way of a non-limiting example, the system 10 receives digitized video from one or more cameras 12, which may be rigidly mounted on an aerial platform. The system 10 can also include a digital video capture system 14 and a computing platform 16. The digital video capturing system 14 processes streams of digital video, or converts analog video to digital video, to a form which can be processed by the computing platform 16. The digital video capturing system 14 may be stand-alone hardware, or cards such as Firewire cards which can plug-in directly to the computing platform 16. The computing platform 16 may include a personal computer or workstation (e.g., a Pentium-M 1.8 GHz PC-104 or higher) comprising one or more processors 20 which includes a bus system 22 which is fed by video data streams 24 via the one or more processors 20 or directly to a computer-readable medium 26. The computer readable medium 26 can also be used for storing the instructions of the system 10 to be executed by the one or more processors 20, including an operating system, such as the Windows or the Linux operating system. The computer readable medium 26 can further be used for the storing and retrieval of the entity networks and associated video clips of the present invention in one or more databases. The computer readable medium 26 can include a combination of volatile memory, such as RAM memory, and non-volatile memory, such as flash memory, optical disk(s), and/or hard disk(s). Portions of a processed video data stream 28 can be stored temporarily in the computer readable medium 26 for later output along with visual diagrams of entity network constructs to a monitor 30. The monitor 30 can display processed video data stream and entity network constructs.

Figure 2:
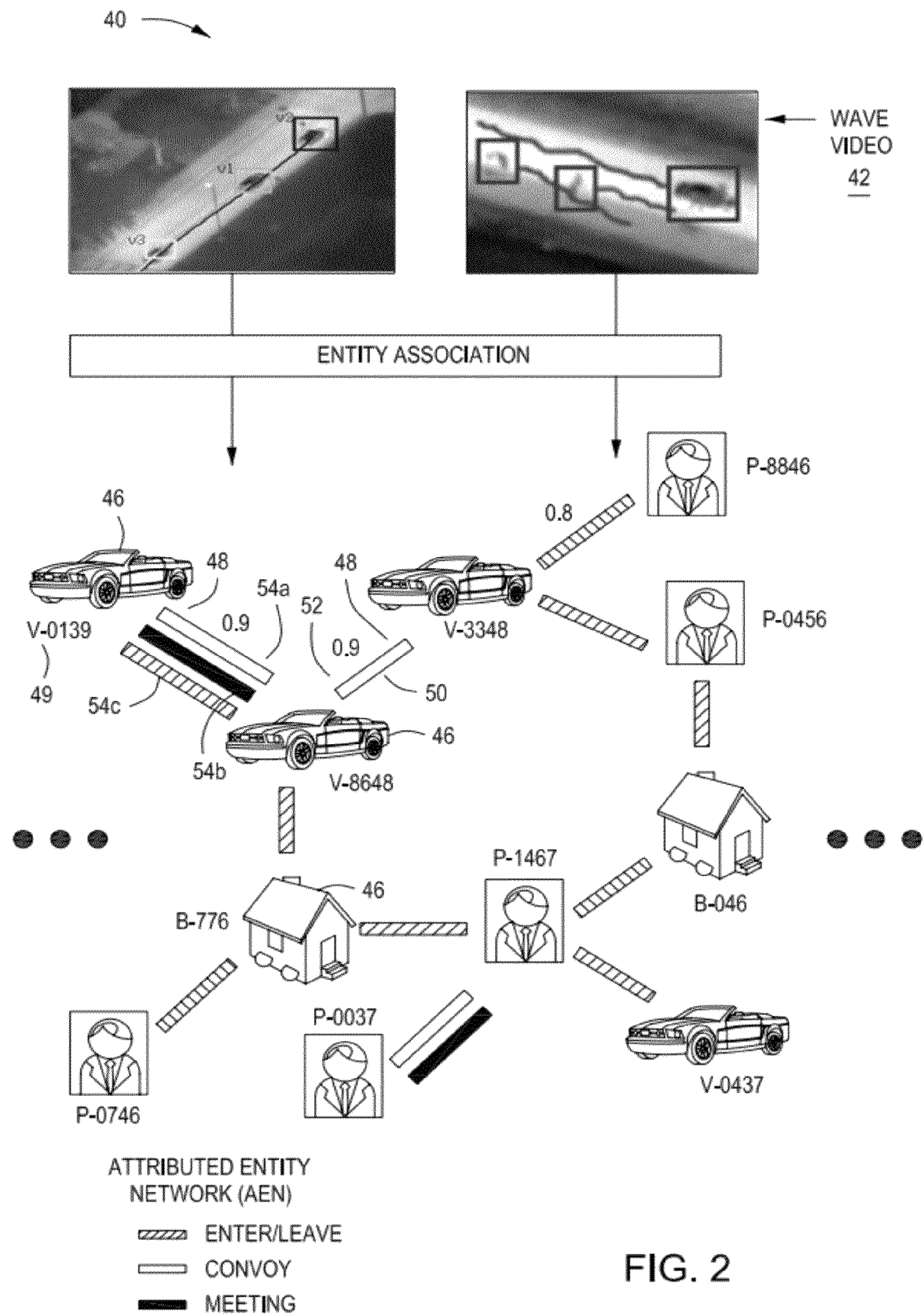
FIG. 2 is a block diagram of an attribute entity network associated with the system of FIG. 1.

Referring now to FIG. 2, a block diagram of an attribute entity network (AEN) 40, constructed in accordance with an embodiment of the present invention, is depicted. Video data 42 is input to an entity association engine 44 from which the AEN 40 is constructed as a graph. The AEN 40 comprises a plurality of nodes 46 and links 48 which may be extracted at least in part from the video data 42. The nodes 46 represent entities, such as vehicles, people and sites (e.g., buildings, parking lots, roads), and the links 48 represent the relationships amongst two or more nodes 46 observed from video data 42. Each of the nodes 46 has a unique ID 49, and associated entity type and entity attributes (not shown), such as locations of buildings or tracks of vehicles and people. Each of the links 48 includes a type (indicated by a color 50), a confidence measure 52 (probability) and a pointer (not shown) to the associated evidence, i.e., the video segment from which the link is established. There can be multiple links between two entities, each of which represents an association of two entities observed from WAVS data (e.g., the links 54a-54c indicated by multiple colors). The attributed entity network 40 can be stored in a database (not shown) for searching, exploitation and fusion with other entity or social networks created from other information sources. Evidence associated with a linkage, such as a frame or a clip, can also be stored in the database for forensic analysis and verification, Entity associations used to derive the links 48 via the entity association engine 44 are found from the aprioiri understanding of people and vehicle movements and activities through track analysis to be discussed in connection with FIG. 3 hereinbelow. Some typical associations include:

Vehicle-vehicle association: Convoy; vehicles parked close by in a deserted area; vehicle-to-vehicle transfer of materials; interactions among occupants of vehicles, etc.

People-people association: Walking, running together; meeting; entering/leaving the same vehicle/house; involved in the same activities, such as loading, unloading a vehicle.

People-vehicle association: Entering, exiting, loading and unloading a vehicle.

Vehicle-site association: Entering or leaving a garage or the parking lot of a building; parked close to a house.

People-site association: Entering or leaving a house or a building; often seen in an area or on a road or a walkway.

Site-site association: Site-to-site association is mainly established through people and vehicles associated with the two or more sites. For instance, two or more vehicles driven by a few people leaving a warehouse and ending at slightly different times at a chemical factory establishes an association between the warehouse and the factory through the agents connecting them, the vehicles and people.

Figure 3:
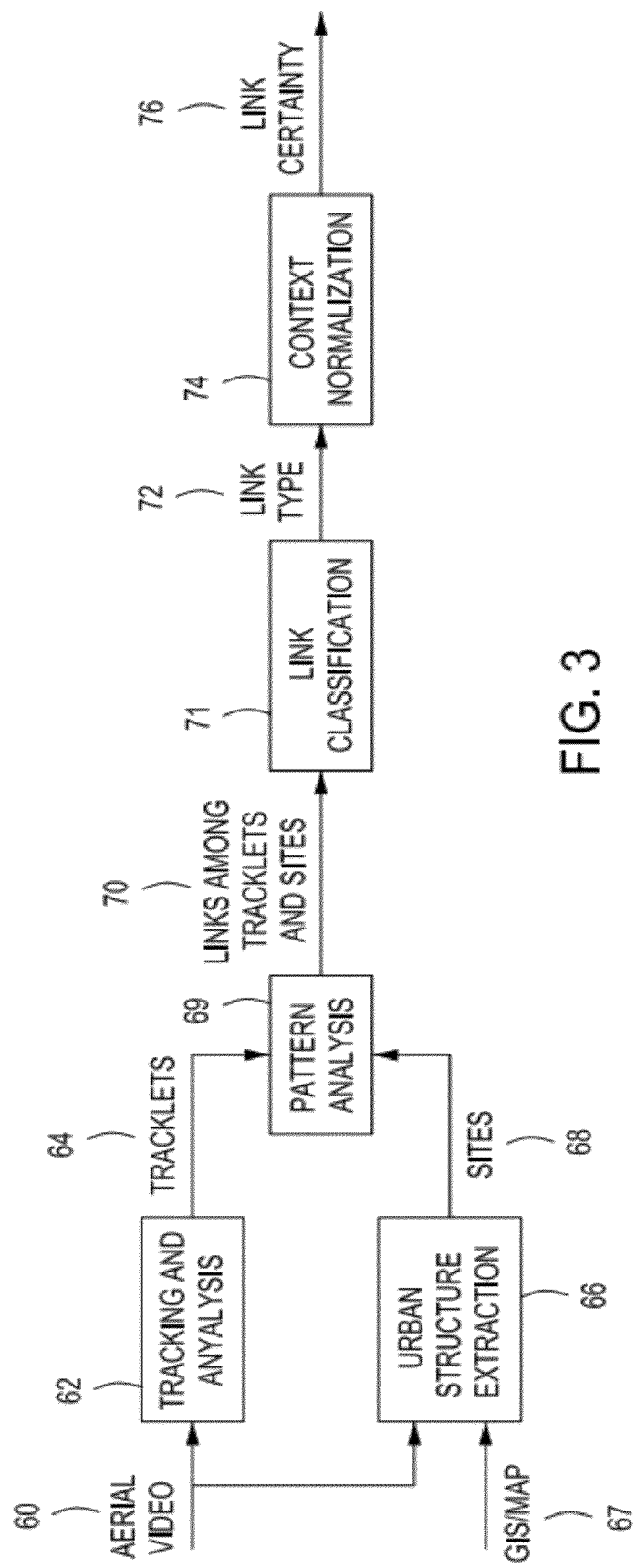
FIG. 3 is a block diagram pertaining to a pattern analysis technique for track based entity association to derive the links, link types, and link certainties of FIG. 2.

Referring now to FIG. 3, a block diagram pertaining to a pattern analysis technique for track based entity association to derive the links 48, link types, and link certainties of FIG. 2 is depicted. People and vehicle movements are key features for linking people, vehicles and sites. A vehicle leaves a house, picks up a passenger from another house, and enters the garage of an office building will not only link the two people in the vehicle, but also the three sites and other people in the two residences. However, association using tracks may not always be as straight forward as described in the above example. Vehicles parked in a parking lot or stopped at an intersection may or may not be related. Therefore, in addition to detecting links, it is necessary to assess the certainty and importance of a link between two entities using tracks (i.e., the trajectory of an object in a video).

Figure 4:
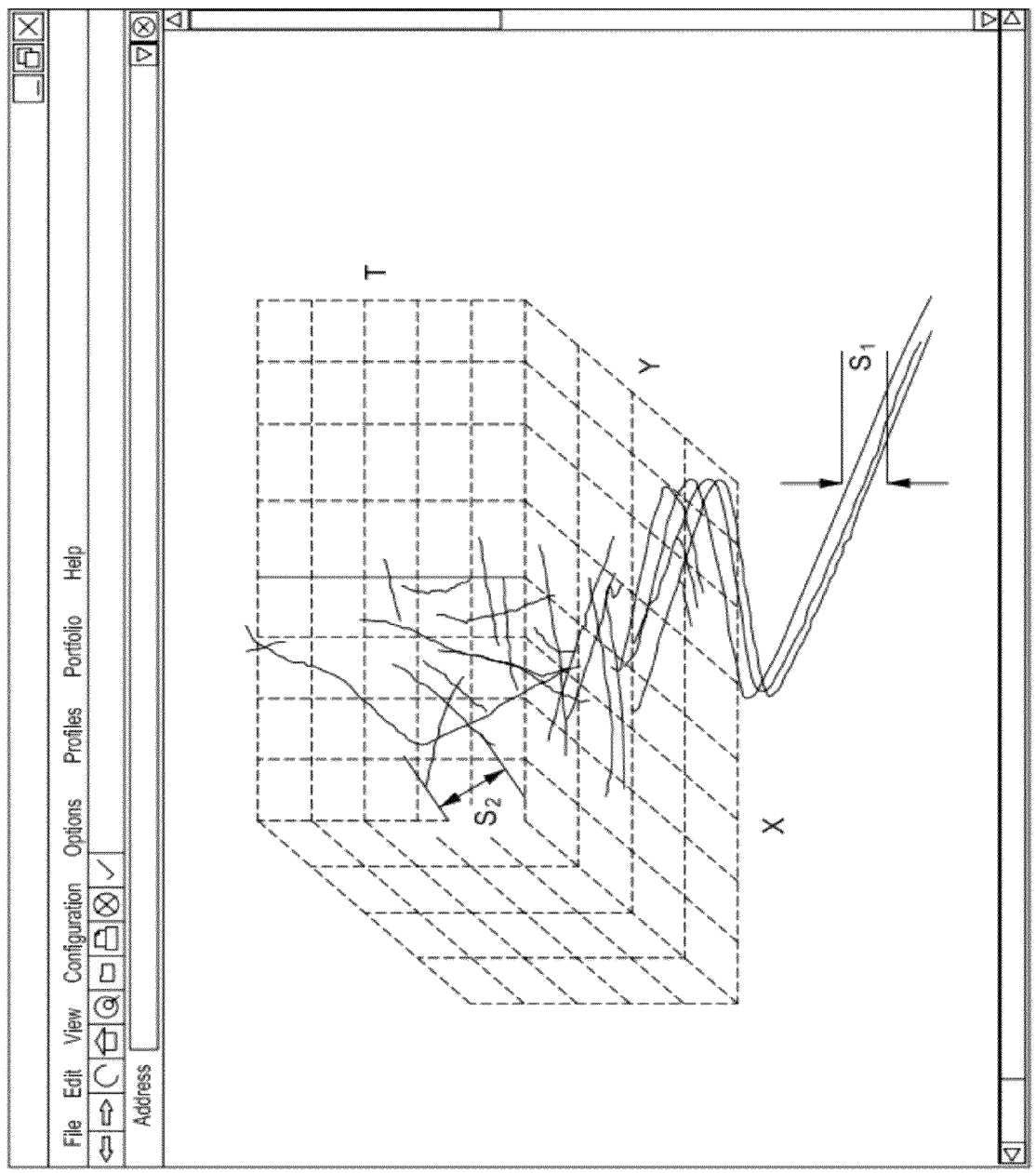
FIG. 4 is a graph depicting a 3D representation of tracklets as poly-lines.

As shown in FIG. 3, UAV video 60 is fed to the first module, tracking and analysis 62. The tracking and analysis module 62 breaks entity tracks from the video 60 into tracklets 64 by identifying entity behaviors, also called spatial actions, such as start, stop, turn, appear and disappear. The tracking and analysis module 62 determines which objects in the video 60 are moving and then tracks those objects. At substantially the same time, the UAV video 30 is fed to an urban structure extraction module 66 (along with optional GIS data 67), which determines which structures in the video 60 are buildings and builds descriptions of site locations (sites 68) from the video 60. With the set of tracklets 64 and site locations and extents 68, pattern analysis 69 is performed to group the tracklets 64 or the tracklets 64 and the sites 68. Referring now to FIG. 4, tracklets are represented as 3D (x, y, t) poly-lines. $S_1$ is a similarity measure for the closeness of two tracklets, which is used for detecting a convoy. $S_2$ measures the (x, y, t) distance of the start/end points of two tracklets, which is used for detecting entity interactions, such as mounting and dismounting. Using a similarity measure (i.e., a metric for the closeness of two tracklets), an adjacency graph is built for the tracklets 64 and the sites 68. Using graph analysis, links 70 are generated from the adjacency graph.

Both pre-defined similarity measures and those extracted from track data using intrinsic dimension analysis can be employed. Pre-defined similarity measures are related to activities or behavior of interest. For example, a spatio-temporal similarity measure at the tracklet level can be used to detect a convoy and group of people walking together. The distance in the (x, y, t) space between two end points of two tracklets can be used to detect people mounting or dismounting, vehicles. Similarity measures discovered from tracklets can cue analysts to unknown patterns that might be of interest.

Figure 5A:
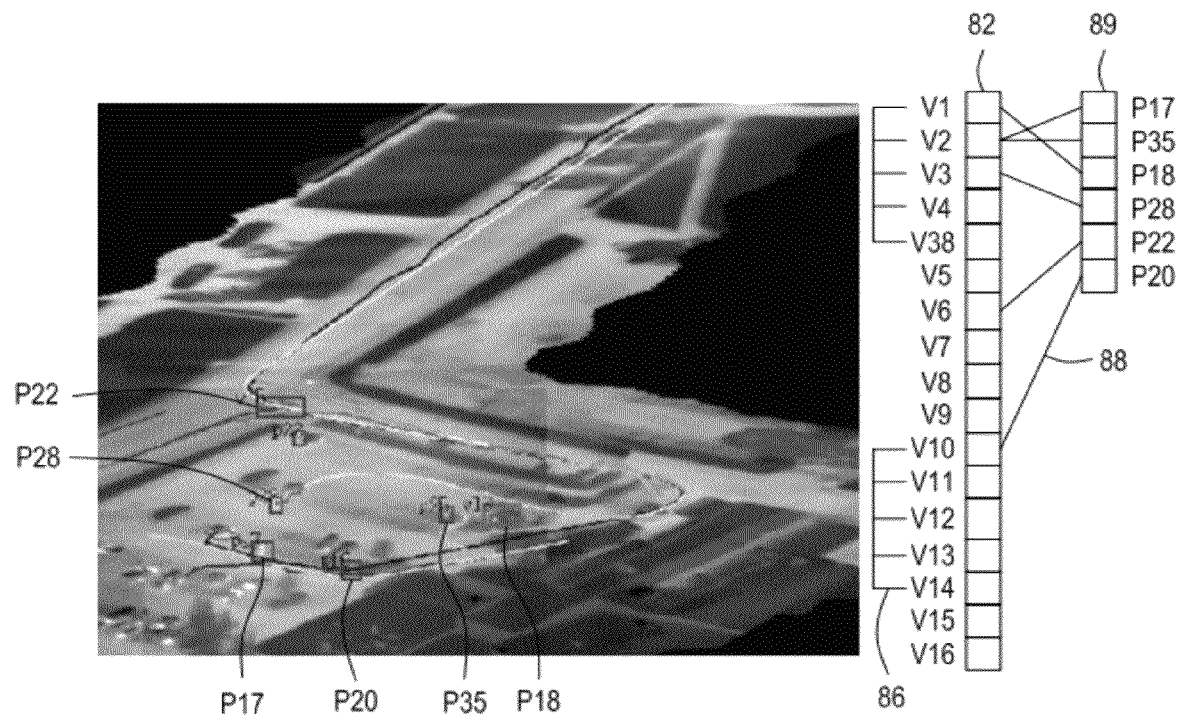
FIG. 5A shows a snapshot of preliminary results of automated entity association through track analysis using WAVS video data.
Figure 5B:
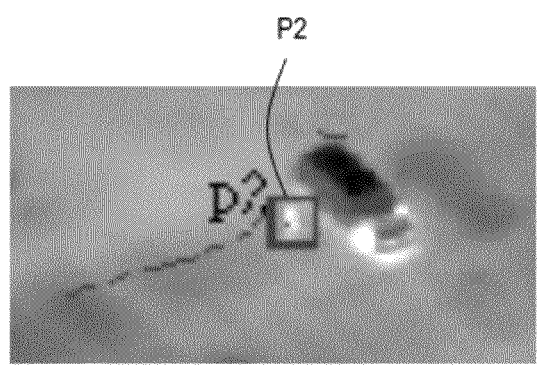
FIG. 5B shows a snapshot of mounting activity captured as evidence for associating a person with a vehicle derived from FIG. 5A.

FIG. 5A shows preliminary results of automated entity association through track analysis using WAVS video data. Vehicle-Vehicle, Vehicle-People and People-People associations derived from tracks analysis include track-related behaviors such as vehicles traveling as a convoy, and people mounting and dismounting vehicles. The two columns of chips are vehicle chips on the left 82 and people chips on the right 84. The links 86 among vehicle chips represent detected convoy behavior. Links 88 among vehicle and people chips represent mounting and dismounting activity. FIG. 5B shows mounting activity captured as evidence for associating a person with a vehicle.

Referring again to FIG. 3, the link classification module 71 classifies the links 70 into categories (link types 72) based on attributes of the tracklets 64 and the sites 68. For instance, when a stopped vehicle track and appearance of a person track indicate a dismounting activity, the person is determined to be the occupant of the vehicle. The last module, context normalization 80, estimates the importance and the certainty of a link 70. The context normalization module 80 weights each link by the type of the link 70, the type of the site 68 and the inverse frequency of the same ink types 72 and the site 68. In this way, two cars parked together in a parking lot will be a much weaker link than two cars parking together in a deserted area or around a house. However, using the link types 72, e.g., mounting and dismounting, are considered strong links even if the mounting and dismounting occur in a parking lot. The output of the context normalization module 74 is a link certainty 76, which is assigned to the link 70 and is a measure of the degree of confidence of assigning the link 70.

For capturing the associations between entities by means of track analysis and to better detect behaviors of interest, it is desirable to detect events. The present invention detects events at multiple levels from primitive events, such as actions, to complex events over large spatial and temporal extent involving multiple agents. Referring now to Table 1, actions/events can be classified into spatial actions and behavioral actions. Spatial actions, such as start, disappear, turn, etc., can be inferred purely from tracks or the interactions among tracks. Spatial actions are detected using track analysis as described above. Another category of actions are behavioral actions, which are coordinated movements of different parts of an object, e.g., load, unload, push, throw, and other human actions.

TABLE 1

| | |
|---|---|
| Spatial actions | start, stop, appear, disappear, accelerate, de-accelerate, move, enter, leave, meet, disperse, follow/chase, pass, turn |
| Behavioral actions | load, unload, drop, pick-up, throw, push, drag, carry, dig, kick, crouch |

Behavioral actions typically involve people, objects and their interactions in a short time interval, such as talking/fighting, loading/unloading, etc. The motion of people in behavioral actions can be more complicated than in spatial actions. For example, in a loading action, a hand or arm movement is associated with the object being lifted. To recognize behavioral actions, Spatial-Temporal Object (STO) Analysis is employed which integrates object and object part interactions and generates spatio-temporal motion correlations.

Figure 6:
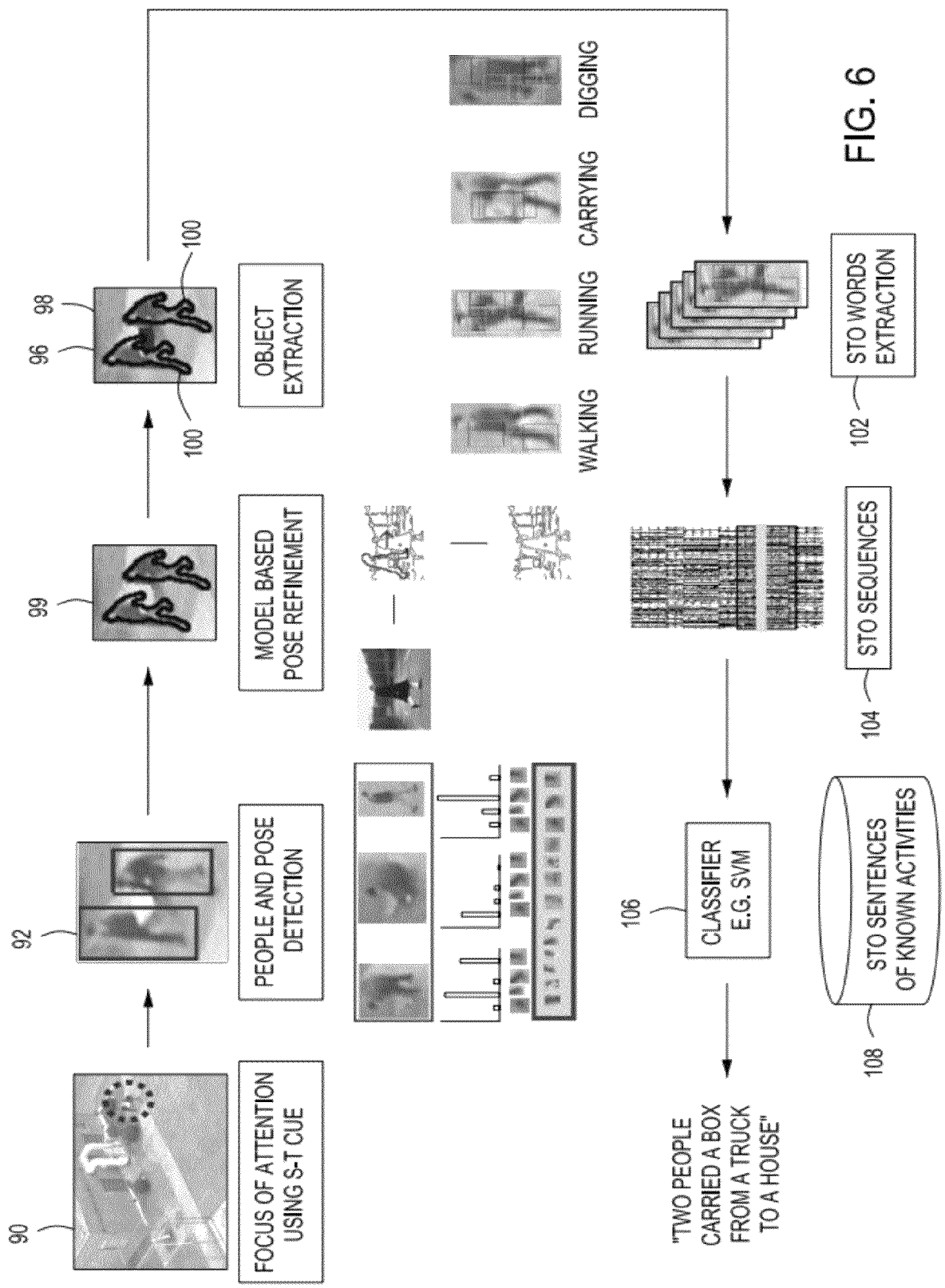
FIG. 6 depicts the steps of a Spatial-Temporal Object (STO) Analysis process for recognizing behavioral actions.

Referring now to FIG. 6, the Spatial-Temporal Object (STO) Analysis process is illustrated. At step 90, a focus-of-attention of moving objects in a video is obtained using Spatio-Temporal Cues (such as motion and appearance). Zooming in on the focus of attention, which, instead of using an object as a whole, spatio-temporal fragments or parts models are used that are extracted from the objects, such as hands and arm regions from a person. As a result; behavioral action involving articulation can be handled effectively. At step 92, the fragment extraction algorithm uses spatio-temporal video features such as human poses computed from videos and model based matching that is resilient to occlusion and background clutter. At step 94, the poses of people are refined. At step 96, objects associated with moving people having a given pose are extracted and classified, such as a box 98 associated with the people 100 having similar poses. At step 102, feature words are extracted from the objects and people moving together which are called spatio-temporal object words, such as walking, running, carrying, digging, etc. The spatio-temporal representation of object fragments, including location, states and motion are expressed using an STO vocabulary both as words for each time instant and as sentences for a time interval. At step 104, these spatio-temporal object words and sentences are encoded as feature vectors. At step 106, STO sentences are then classified using a Supporting Vector Machine (SVM) with the optional aid of an STO sentences of known activities database 108 into different actions, such as "Two people carried a box from a truck to a house."

Complex composite events over large spatial and temporal extent involving multiple agents present unique challenges for automated detection:

Huge candidate space—Because of the volume of WAVS data, the number of objects detected is huge and the number of interactions among these objects is prohibitively large. Moreover, the number of events to be detected grows over time. Therefore, it is desired that an event detection system be able to scale-up to the amount of data and the number of events in WAVS data.

Lack of observability and causality in event detection— Not all actions or sub-events can be observed or detected. Therefore, event detection algorithms have to be robust and smart. For example, when unloading of material cannot be directly observed, it can be inferred from the changes from the back of a truck or how people carry a barrel at two time instants. Thus, an effective event algorithm needs to have advanced reasoning capabilities.

Uncertainty—Uncertainty in varying degrees is associated with every step of event detection. It is a challenge to manage and reason with uncertainty in event detection.

The present invention meets these goals by merging) an event ontology with hierarchical weighted graph matching to reduce the candidate space. Only a small number of key sub-events are matched with detailed matching involving only well-qualified candidates. Additionally, a Markov Logic Network is used for reasoning and inferencing in visual and geo-spatial domains.

Figure 7:
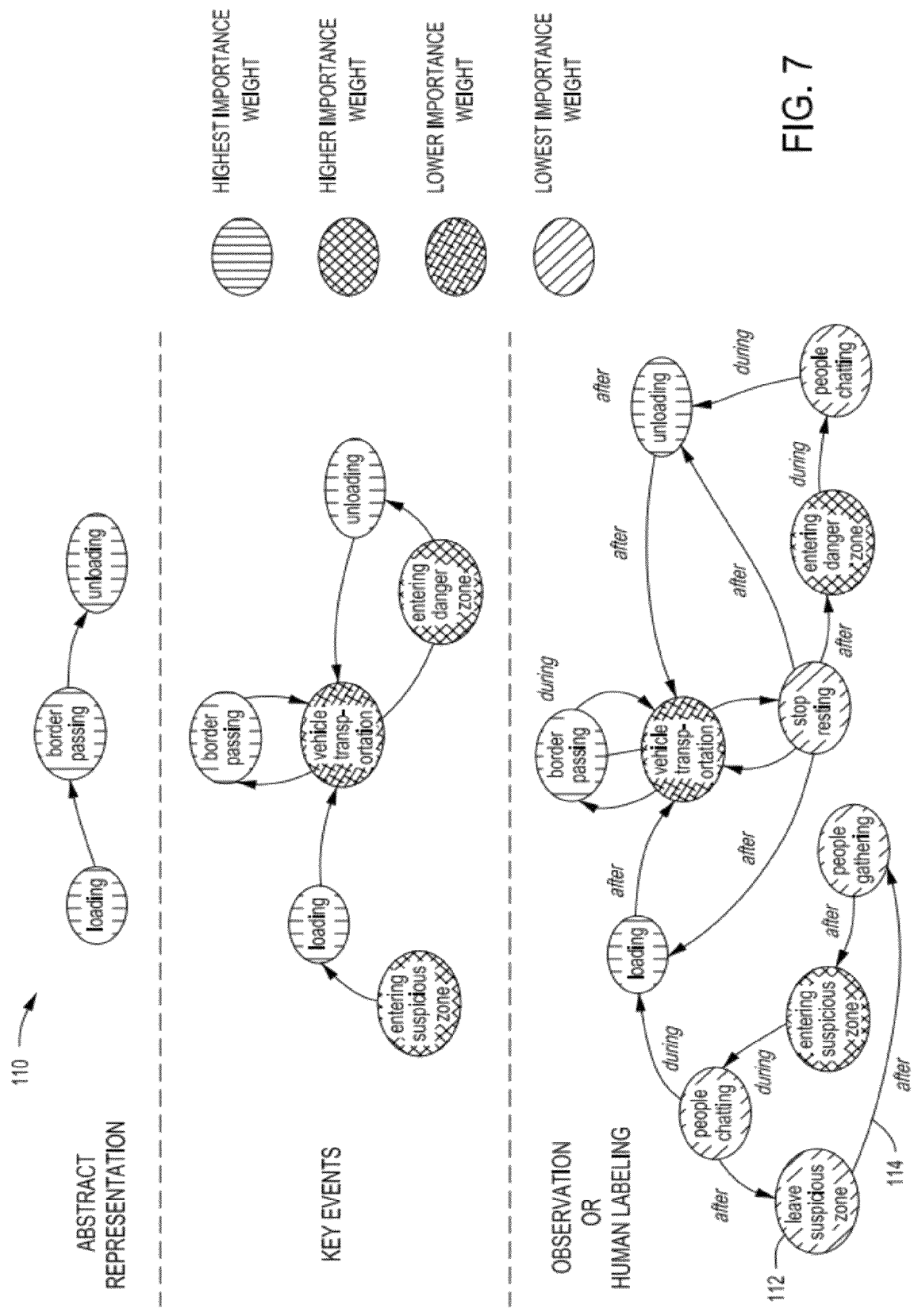
FIG. 7 is a diagram depicting a composite event represented as an event graph for graph matching.

Referring now to FIG. 7, a composite event can be represented as an event graph 110 for graph matching. In the event graph 110, a node 112 represents a sub-event and a link 114 represents the type of temporal transition between two nodes, such as "after", "during", etc. Each node 112 is also assigned a weight (not shown) proportional to its importance to the overall event. The weights can be user defined in the event ontology. The weights can also be computed from training examples. The weights effectively reveal a level of importance. From a description of an event provided by a user or extracted from a video, a hierarchical event description is formed by removing nodes with small weights and combining the links between nodes with large weights. The example in FIG. 7 depicts, for example, a three-level hierarchical event graph of cross-border weapons smuggling.

Using the hierarchical event graph 110, observations are first matched at the highest level. Only those observations receiving a predetermined minimum matching score pass to a next level for verification. This process is repeated with other observations until a predetermined confidence level is achieved for an event hypothesis to be accepted or rejected. In this way, a large number of observations are quickly filtered and detailed matching is only performed on credible candidates.

To match an event graph, the similarity between two events is computed. Based on the event ontology, the similarity of a pair of objects or actions is computed using a shortest path length measure between two objects/actions in the object/action taxonomy. For example, among actions: "walk", "run" and "pick-up", the similarity values of (walk, run) will be bigger than those of (walk, pick-up). The Complex Event Similarity (CES) can be computed as:

$$CES(A, B) = \sum_{i=1}^{n} w_i \cdot SSE(a_i, b_i) \Big/ \sum_{i=1}^{n} w_i$$

where SSE $(a_1, b_i)$ is the similarity between two corresponding simple events $a_i$ and $b_i$ from the two streams. $W_i$ is the importance weight for the simple event $a_i$. The weights are computed using Term-Frequency Inverse Document Frequency (TFIDF), scheme that has been successfully used to measure similarity of documents. The weights are the product of the frequency of the simple event in the event to be matched to (event template) times the log of the inverse of the frequency of the same simple events observed in the Region-Of-Interest (ROI). The weight of a sub-event depending on an ROI makes the event matching scheme of the present invention adaptive to the environment. For example, in a desert, the frequency of observing a moving object is low. So, when matching an event related to moving objects in a desert, a higher weight is given to the action of moving than detecting the same event in urban environment with heavy traffic.

For robust and effective event detection, advanced reasoning is needed to fill in the gaps using what is observed and to extract intelligence beyond what is visible in a video. For example, the weight of an object can be inferred from how it was carried and the status of a person can inferred from how he gets out of a car and how he is greeted by others. To reason based on objects, tracks, actions, and primitive and complex events, it is desirable to leverage the ease of ingestion and the power of inferencing using first order logic while minimizing the brittleness and scalability of rule-based methods. To this effect, the present invention employs Markov Logic Networks (MLN) as a probabilistic framework for accounting for the uncertainty of video processing and to enable learning. MLN seamlessly integrates learning, logic and probabilistic inferencing and can be used based on either rules or annotated examples or both for event detection and reasoning.

Figure 8:
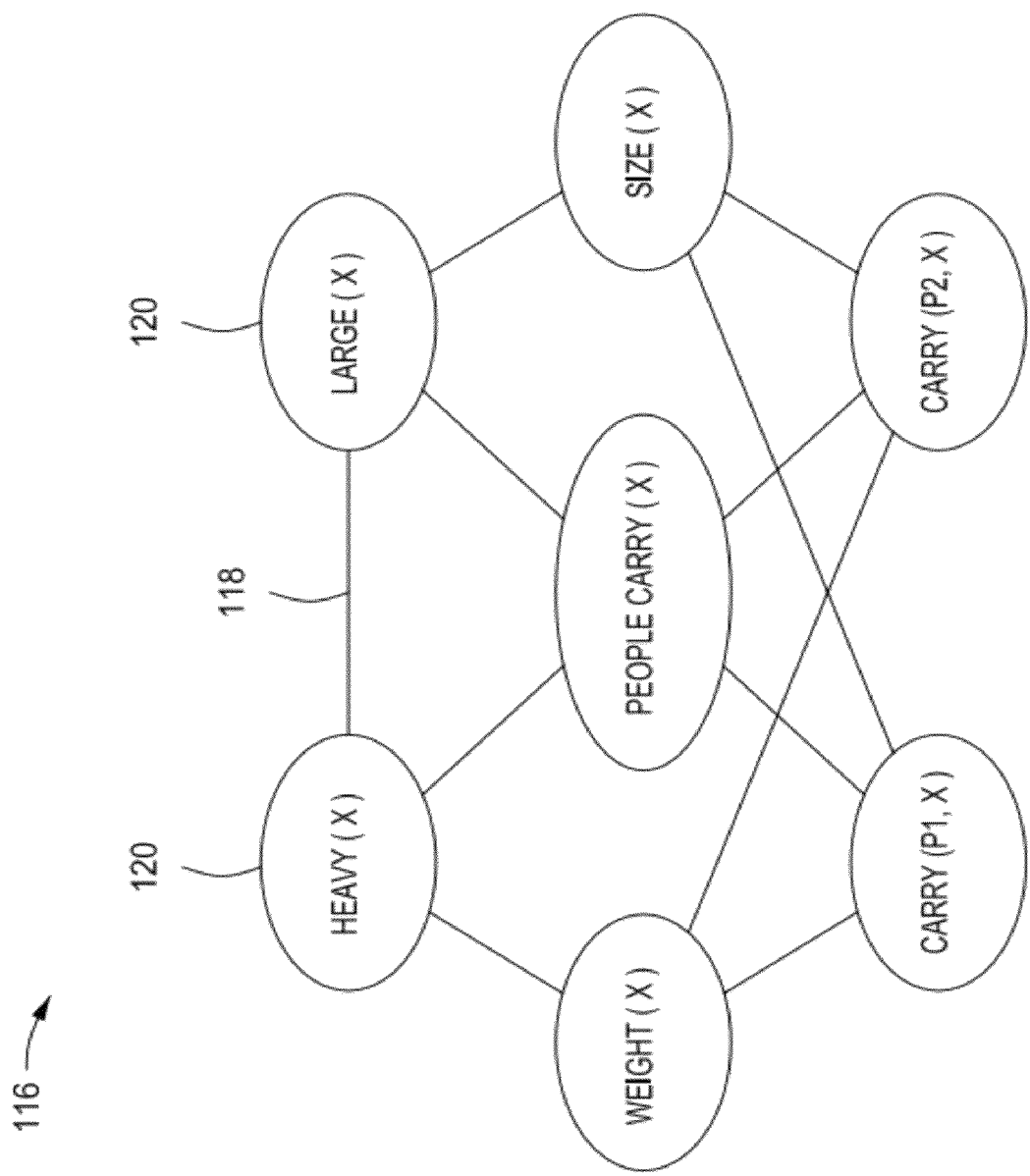
FIG. 8 is a diagram representing a Markov Logic Network.

A Markov Logic Network is a set of pairs (F, w) where F is a formula in first-order logic and w is a weight (real number). These weights can be determined a priori, or can be learned from observed data or examples. Together with a set of constants, MLN defines a network with one node for each grounding (achieved by assigning a constant to a variable) of each predicate in a MLN. A sample ground MLN is shown in FIG. 8. The network 116 includes edges 118 between pairs of atoms 120, which are groundings of predicates. The probability distribution over possible worlds, x, specified by a ground Markov network is:

$$P(x) = \frac{1}{Z} \exp\left(\sum_i w_i * n_i(x)\right)$$

where $w_i$ represents the weight of formula i, $n_i(x)$ is the number of true groundings of formula i in x, and Z is a normalization factor.

MLN is used to infer properties of objects and outcomes of events or actions. A geo-spatial and visual ontology can be developed to provide the attribute set of an object and a rule set for inferencing. The inputs to the MLN reasoning engine are factlets, (i.e., assertions of the video content) extracted from WAVS videos. The goal of employing an MLN is to infer information from these factlets, such as inferring a box is heavy if two instead of one person are carrying it.

Based on factlets from WAVS data, MLN dynamically creates a network and learns the appropriate weights for the formulae that constitute the knowledge base. Once the weights have been updated, MLN can be used to answer queries—e.g., does the knowledge base entail a specific event-related hypothesis? (e.g., "Is the box heavy?"" in FIG. 8). Inferencing using MLNs reduces to the problem of computing the probability that Formula$_x$ is true given that Formula$_1$ is true. MLN enables inferencing about properties/attributes of objects, outcomes of actions and occurrence of complex events such as clandestine meetings, ambush or transportation of weapons or bomb making materials.

To accurately detect anomalous behaviors and anomalous changes of behaviors of an entity, the function of the entity in its urban environment needs to be understood. To this end, ongoing activities in urban areas are observed and functional characteristics of urban entities are modeled and inferred to create an urban context. Using GIS and image analysis major urban structures, such as road, building, square, lot, a water body and open spaces are labeled. Then, an activity model of each urban entity is built using statistics of related vehicles, people and their movement. For example, the activity model of a building will be the number and the type of vehicles entering/leaving the building as a function of time and date. In this way, urban context also captures cultural information, such as difference between weekday and weekend activities and difference of vehicle activities in different part of a city.

Using activity models together with the physical characteristics of an urban structure, urban structures can be classified into not only broad categories, such as residential area, shopping district, factory, office complex, but also into fine classifications, such as movie theaters, retail stores, restaurant, garages and mosques. For example, a large number of vehicles will arrive and leave movie theaters in regular intervals based on the movie schedule, while vehicles arrive and leave a retail stores continuously throughout the day, although fluctuate according to the time of the day, but much less predictable.

Additionally, activity models can also identify functional components that are difficult to detect purely based on appearances. Using tracks and track statistics, the present invention can label the entrance of a building, egress/ingress points of an area, such as gates or check-points, parking lots, drive ways or alleys, etc. The activity of a given a structure or a site can be compared with the activity of the same type structures. In this way, abnormal structures are identified, such as a house or a store that has much more car activity than the norm of its class.

The present invention can provide advanced capabilities for searching, browsing, retrieval and visualization:

In addition to the simple space-time coverage based search, the present invention enables content-based search and retrieval for entities, entity associations, entity tracks, events and anomalies. The present invention supports searches on people and vehicle activities such as people and vehicle entering/leaving an area of interest (AOI) in a time interval or vehicles briefly stopped along a given road.

The present invention also enables composite queries defined through a workflow. Composite queries, such as "find vehicles that leave area A, take different routes and meet in area B", are not supported. The present invention allows analysts to build composite queries using simple queries and workflow tools.

Figure 9:
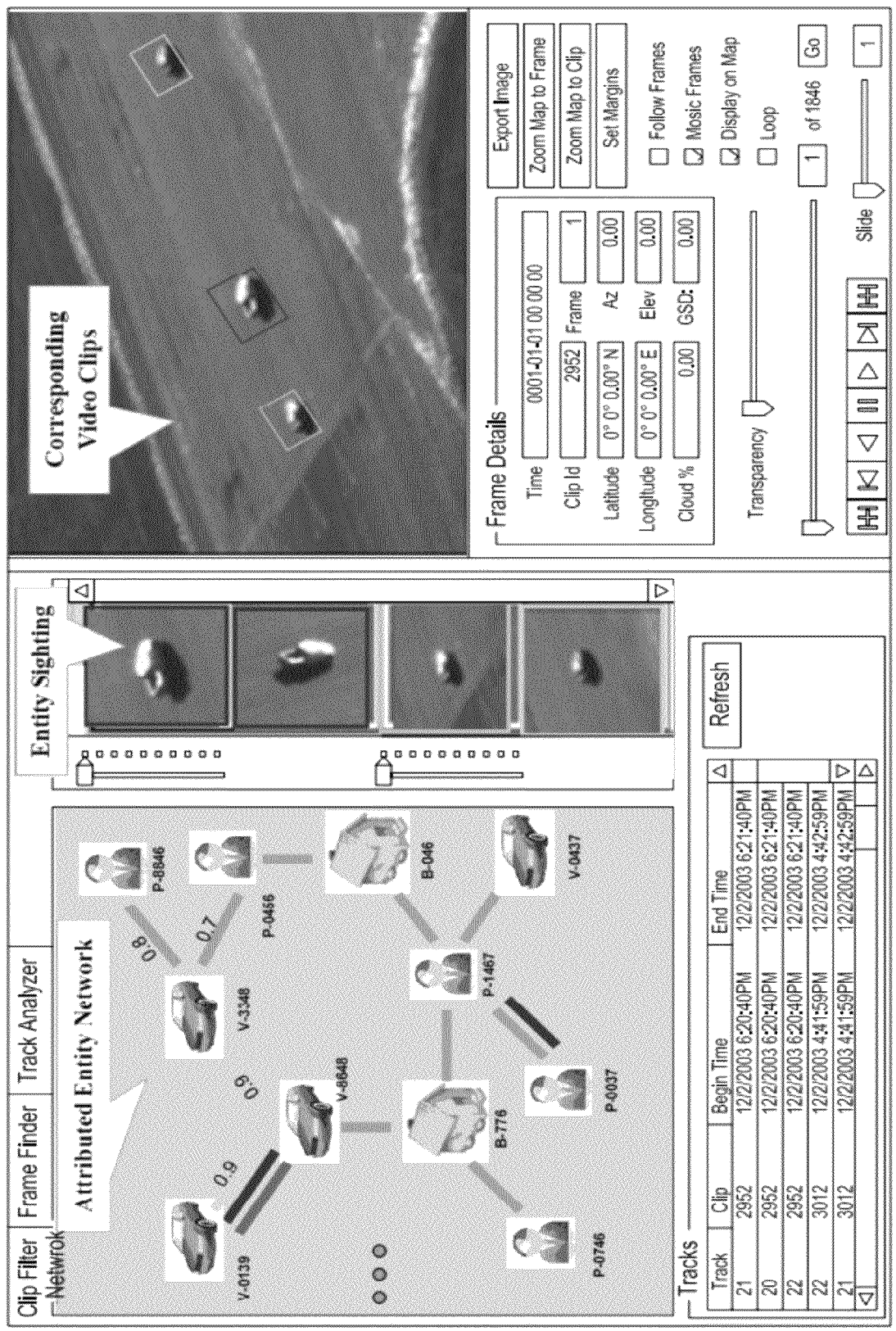
FIG. 9 is a screen shot of an entity-centric analyzer GUI that allows an analyst to co-exploit entity tracks, entity sightings, entity networks and videos containing entities and their interactions.

The present invention provides entity and event centric browsing tools that help analysts exploit complex relationships among entities and events for both intelligence and forensic analysis. FIG. 9 shows an envisioned entity-centric analyzer that allows an analyst to co-exploit entity tracks, entity sightings, entity networks and videos containing entities and their interactions in the same GUI window. Analysts also can easily move the focal point from one entity to a related entity with a single click.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A computer implemented method for deriving an attribute entity network (AEN) from video data, comprising the steps of:
    extracting at least two entities from the video data;
    tracking trajectories, based on the video data, of the at least two entities to form at least two tracklets;
    deriving at least one association between at least two entities by detecting at least one event involving the at least two entities, said detecting of at least one event being based on detecting at least one spatio-temporal motion correlation between the at least two entities; and
    constructing the AEN as a graph wherein the at least two entities form at least two nodes and the at least one association forms a link between the at least two nodes.

2. The method of claim 1, wherein the entity extraction step further comprises the steps of:
    detecting moving objects and classifying them into vehicle and people; and
    determining which structures in the video data are at least one of roads, parking lots, buildings and building descriptions of sites.

3. The method of claim 1, wherein the deriving step further comprises the steps of:
    calculating a similarity measure of the closeness of the at least two tracklets;
    identifying entity behaviors comprising at least one of spatial actions and behavioral action; and
    performing pattern analysis to group the at least two tracklets and sites.

4. The method of claim 1, wherein the at least one event is classified as one of a spatial action and a behavioral action.

5. The method of claim 4, wherein a behavioral action is detected using Spatial-Temporal Object (STO) Analysis.

6. The method of claim 5, wherein STO Analysis comprises the steps of:
    obtaining a focus-of-attention of moving objects in the video data using Spatio-Temporal Cues;
    obtaining spatio-temporal fragments extracted from the moving objects within the focus-of-attention, the moving objects including at least one person;
    combining the obtaining spatio-temporal fragments to compute at least one pose of the at least one person;
    extracting and classifying at least one object associated the at least one person;
    extracting feature words are extracted from the at least one objects and at least one person to create spatio-temporal object words;
    encoding the spatio-temporal object words as feature vectors; and
    classifying the feature vectors using a Supporting Vector Machine (SVM).

7. The method of claim 1, further comprising the steps of merging an event ontology with hierarchical weighted graph matching to reduce candidate space wherein the candidate space comprises all entities to be tracked.

8. The method of claim 7, wherein the step of merging an event ontology with hierarchical weighted graph matching further comprising the steps of:
    constructing an event graph wherein a node represents a sub-event and a link represents the type of temporal transition between two nodes, the link being assigned a weight that is proportional to the importance of the temporal transition to the overall event;
    forming a hierarchical event description by removing nodes with small weights and combining the links between nodes with large weights;

matching observations using the hierarchical event graph at its highest level, wherein observations receiving a predetermined minimum matching score being passed to a next level for verification; and repeating the step of matching with other observations until a predetermined confidence level is achieved for accepting or rejecting an event.

9. The method of claim 8, wherein the step of matching further comprising the step of computing the similarity between two events using a shortest path length measure between two entities/actions in an entity/action taxonomy.

10. The method of claim 1, further comprising the step of employing a Markov Logic Network for reasoning and inferencing in visual and geo-spatial domains the spatio-temporal motion correlation between the at least two entities.

11. An apparatus for deriving an attribute entity network (AEN) from video data, comprising:
　at least one camera for generating the video data;
　a processor communicatively connected to said at least one camera, said processor being configured for:
　　extracting at least two entities from the video data;
　　tracking trajectories of the at least two entities to form at least two tracklets;
　　deriving at least one association between at least two entities by detecting at least one event involving the at least two entities, said detecting of at least one event being based on detecting at least one spatio-temporal motion correlation between the at least two entities; and
　　constructing the AEN as a graph wherein the at least two entities form at least two nodes and the at least one association forms a link between the at least two nodes; and
　a display for displaying the AEN.

12. The apparatus of claim 11, wherein the at least one event is classified as one of a spatial action and a behavioral action, wherein the behavioral action is detected using Spatial-Temporal Object (STO) Analysis.

13. The apparatus of claim 12, wherein STO Analysis comprises the steps of:
　obtaining a focus-of-attention of moving objects in the video data using Spatio-Temporal Cues;
　obtaining spatio-temporal fragments extracted from the moving objects within the focus-of-attention, the moving objects including at least one person;
　combining the obtaining spatio-temporal fragments to compute at least one pose of the at least one person;
　extracting and classifying at least one object associated the at least one person;
　extracting feature words are extracted from the at least one objects and at least one person to create spatio-temporal object words;
　encoding the spatio-temporal object words as feature vectors; and
　classifying the feature vectors using a Supporting Vector Machine (SVM).

14. The apparatus of claim 11, wherein the processor is further configured for merging an event ontology with hierarchical weighted graph matching to reduce candidate space wherein the candidate space comprises all entities to be tracked.

15. The apparatus of claim 14, wherein merging an event ontology with hierarchical weighted graph matching further comprises:
　constructing an event graph wherein a node represents a sub-event and a link represents the type of temporal transition between two nodes, the link being assigned a weight that is proportional to the importance of the temporal transition to the overall event;
　forming a hierarchical event description by removing nodes with small weights and combining the links between nodes with large weights;
　matching observations using the hierarchical event graph at its highest level, wherein observations receiving a predetermined minimum matching score being passed to a next level for verification; and
　repeating the step of matching with other observations until a predetermined confidence level is achieved for accepting or rejecting an event.

16. The apparatus of claim 11, wherein the processor is further configured for employing a Markov Logic Network for reasoning and inferencing in visual and geo-spatial domains.

17. A non-transitory computer-readable medium carrying one or more sequences for deriving an attribute entity network (AEN) from video data, wherein execution of the one of more sequences of instructions by one or more processors causes the one or more processors to perform the steps of:
　extracting at least two entities from the video data;
　tracking trajectories of the at least two entities to form at least two tracklets;
　deriving at least one association between at least two entities by detecting at least one event involving the at least two entities, said detecting of at least one event being based on detecting at least one spatio-temporal motion correlation between the at least two entities; and
　constructing the AEN as a graph wherein the at least two entities form at least two nodes and the at least one association forms a link between the at least two nodes.

18. The computer-readable medium of claim 17, wherein the at least one event is classified as one of a spatial action and a behavioral action, wherein the behavioral action is detected using Spatial-Temporal Object (STO) Analysis.

19. The computer-readable medium of claim 18, wherein STO Analysis comprises the steps of:
　obtaining a focus-of-attention of moving objects in the video data using Spatio-Temporal Cues;
　obtaining spatio-temporal fragments extracted from the moving objects within the focus-of-attention, the moving objects including at least one person;
　combining the obtaining spatio-temporal fragments to compute at least one pose of the at least one person;
　extracting and classifying at least one object associated the at least one person;
　extracting feature words are extracted from the at least one objects and at least one person to create spatio-temporal object words;
　encoding the spatio-temporal object words as feature vectors; and
　classifying the feature vectors using a Supporting Vector Machine (SVM).

20. The computer-readable medium of claim 17, further comprising the steps of merging an event ontology with hierarchical weighted graph matching to reduce candidate space wherein the candidate space comprises all entities to be tracked.

21. The computer-readable medium of claim 20, wherein merging an event ontology with hierarchical weighted graph matching further comprises:
　constructing an event graph wherein a node represents a sub-event and a link represents the type of temporal transition between two nodes, the link being assigned a weight that is proportional to the importance of the temporal transition to the overall event;

forming a hierarchical event description by removing nodes with small weights and combining the links between nodes with large weights;

matching observations using the hierarchical event graph at its highest level, wherein observations receiving a predetermined minimum matching score being passed to a next level for verification; and repeating the step of matching with other observations until a predetermined confidence level is achieved for accepting or rejecting an event.

22. The computer-readable medium of claim 17, wherein further comprising the steps of employing a Markov Logic Network for reasoning and inferencing in visual and geospatial domains.

* * * * *

UNITED STATES PATENT AND TRADEMARK OFFICE
CERTIFICATE OF CORRECTION

PATENT NO. : 8,294,763 B2  
APPLICATION NO. : 12/271173  
DATED : October 23, 2012  
INVENTOR(S) : Hui Cheng et al.

It is certified that error appears in the above-identified patent and that said Letters Patent is hereby corrected as shown below:

In the Specification

In Column 1, line 15, delete "contract number H94003-04-120006-0011" and substitute therefor --contract number NBCH-07-0062--.

Signed and Sealed this  
Twenty-eighth Day of October, 2014

Michelle K. Lee  
*Deputy Director of the United States Patent and Trademark Office*

UNITED STATES PATENT AND TRADEMARK OFFICE
CERTIFICATE OF CORRECTION

PATENT NO.        : 8,294,763 B2                                          Page 1 of 1
APPLICATION NO.   : 12/271173
DATED             : October 23, 2012
INVENTOR(S)       : Hui Cheng et al.

It is certified that error appears in the above-identified patent and that said Letters Patent is hereby corrected as shown below:

In the Specification

In Column 1, line 15, delete "contract number H94003-04-120006-0011" and substitute therefor --contract number NBCH-C-07-0062--.

This certificate supersedes the Certificate of Correction issued October 28, 2014.

Signed and Sealed this
Twenty-sixth Day of May, 2015

Michelle K. Lee
*Director of the United States Patent and Trademark Office*